3,385,658
ALUMINUM FLUORIDE MANUFACTURE WITH
A MOVING ALUMINUM FLUORIDE BED
German Broja, Leverkusen, and Horst Gradinger, Krefeld-Bockum, Germany, assignors to Farbenfabriken Bayer Aktiengesellschaft, Leverkusen, Germany, a corporation of Germany
No Drawing. Filed Oct. 13, 1965, Ser. No. 495,706
Claims priority, application Germany, Oct. 19, 1964,
F 44,259
6 Claims. (Cl. 23—88)

ABSTRACT OF THE DISCLOSURE

Process for the continuous preparation of aluminum fluoride from hydrated aluminum oxides and hydrofluoric acid which comprises mixing and reacting hydrated aluminum oxide and aqueous hydrofluoric acid in a concentration to maintain an HF concentration in the reaction mixture of at least 50 percent and solidifying the reaction product on a moving bed of solid granules of aluminum fluoride having a particle size of between 10 and 30 mm. maintained at a temperature greater than about 50° C., the moving bed containing sufficient granules of aluminum fluoride to prevent incrustation on the walls of the reactor.

This invention pertains to the manufacture of aluminum fluoride from hydrated aluminum oxides and hydrofluoric acid. The aluminum fluoride may be readily produced on a continuous basis and in a hydrate form wherein it may be either dehydrated or mixed with sodium fluoride for reaction to form cryolite.

In processes known to the art for manufacture of aluminum fluoride from aluminum hydroxide a number of disadvantages have become apparent. For example, it is known to react the aqueous hydrogen fluoride and hydrated aluminum oxides starting materials at a somewhat elevated temperature on a batch basis, the components reacting with formation of a liquid product which, after a relatively long period, hardens to a solid aluminum fluoride hydrate. Such a process is often carried out in flat caldrons or rotating reaction drums. When flat caldrons are used, the hot liquid mass is discharged, after the reaction, into flat containers in which it is allowed to solidify. To be removed from the containers the product uses drastic mechanical means, for example, drilling with a compressed-air hammer.

When the procedure is carried out in a rotating reaction drum, slurry of hydrated aluminum oxides and aqueous hydrofluoric acid of average concentration are run into the rotating drum and, upon completing the reaction, the liquid mass is allowed to remain in the drum, which continues to rotate, until it hardens. This second procedure, although it avoids blasting out the solidified masses from within the containers, also has the disadvantage that the walls of the reaction drums must be mechanically cleansed of baked-on aluminum fluoride.

To avoid the production of a hardened end product, it has been proposed to prepare aluminum fluoride by treating hydrated aluminum oxides in a fluidized bed with gaseous hydrogen fluoride. Such a process requires the use of anhydrous hydrogen fluoride, a much more expensive reagent than the aqueous fluoride solutions used in other processes. Also, the resulting aluminum fluoride has a higher alumina content than desirable and is in the form of fine powder which leads to a dust problem. Also, the anhydrous aluminum fluoride obtained cannot be converted to cryolite by the simple addition of sodium fluoride.

In this invention, hydrated aluminum oxides and aqueous hydrogen fluoride are reacted and the liquid reaction mixture is contacted with a moving bed of warm solid aluminum fluoride granules. The granules may comprise aluminum fluoride and/or aluminum fluoride hydrate. These granules are usually maintained at a temperature of at least about 50° C., preferably about 100–150° C., and generally are provided in the amount of about 50–300% by weight of the liquid reaction mixture.

A suitable procedure is to continuously react, in a mixing device, aqueous hydrofluoric acid having a concentration of about 50–80%, preferably about 60–65%, with a hydrate of aluminum oxide in a molar ratio of about 1:3, plus a slight excess of HF of about 1–20%, preferably of about 1–10%, based on the stoichiometric amount necessary for the formation of $AlF_3$.

The term hydrated aluminum oxide comprises aluminum trihydrate $[Al(OH)_3]$ as well as lower hydrated forms of aluminum oxides, such as AlO(OH) in its various and reactive modifications. Those hydrated aluminum oxides are preferred which react very promptly with HF. Therefore, for example $\alpha$—$Al_2O_3$— corundum or the crystal modification of diaspore which do not react with water to form aluminum trihydrate, are not suitable as starting materials per se. Generally spoken, all aluminum oxides and lower hydroxides can be used, which react in a short time with water to form $Al(OH)_3$. Preferably the trihydrate itself in the dry form is employed. It is, however, not necessary to apply the anhydrous form, as the reaction medium contains an appreciable amount of water by the hydrofluoric acid used. Therefore, also $AlO(OH).nH_2O$, $Al(OH)_3.nH_2O$ and mixtures thereof can be used. It is also possible to start with aqueous slurries of hydrated aluminum oxides. In this case, however, higher concentrated hydrofluoric acids must be applied to maintain a HF-concentration of at least 50% in the reaction medium. However, the diluted hydrofluoric acids of a concentration of about 60–65% are preferred, together with dry $Al(OH)_3$, as this performance of the process avoids the liberation of heat of dilution in the reaction apparatus thereby preventing the evaporation of gaseous HF.

The contact of the liquid reaction mixture with solid aluminum fluoride granules advantageously may take place in a heated rotating drum, partially filled with the solid product granules. The granules are present in an amount sufficient to prevent incrustation of the drum walls. The size of the granules may be controlled within certain limits by the temperature prevailing inside the reaction drum and the solidification time, as well as by the quantity of products admitted and withdrawn in a given unit of time. The alumina fluoride hydrate that has hardened may be continuously withdrawn from the rotating drum, for example, through an overflow connection. The solid product, which still contains some water of hydration, may then be calcined in a drying oven.

The solid aluminum fluoride granules used during the reaction have a diameter of about between 10 and 30 mm. Generally the feed rate of the aluminum fluoride granules and of the starting materials is so adjusted that the granules diameter of the resulting end product is of the same value as given above. It is, however, possible to produce also larger granules.

The hydrated aluminum oxide and the hydrogen fluoride may be reacted previous to contact with the solid granules or may be continuously fed individually to the moving bed of granules for reaction and solidification in situ. The hydrated aluminum oxide and hydrofluoric acid, in a molar ratio of about 1:3 may be continuously fed into a mixing vessel wherein they react with formation of a viscous mass. This viscous mass is then transferred, for example, by means of a conveyor, into the heated rotating drum.

The process of this invention also may be performed by continuously introducing the hydrofluoric acid and hydrated aluminum oxide separately into the rotating drum and allowing the reaction to proceed along with almost instantaneous solidification onto the aluminum fluoride granules present therein. Also, in this case, no incrustation of the walls of the drum takes place. This modification of the process has the advantage that the heat given off during the exothermic reaction between the hydrofluoric acid and the hydrated aluminum oxide, is exploited during the granulation which takes place simultaneously, so that the external heat which needs to be applied to the rotating drum can be substantially lower. In carrying out this continuous process, it is recommended to operate with a slightly higher mixing proporton of liquid phase reactants to solid reaction product. This proportions depends on the size of the device serving as a reaction and mixing drum.

It is also possible to have the reaction product solidified by causing the liquid reaction mass to fall in drops onto a large quantity of cold aluminum fluoride. However, this procedure is less economical since it requires, on the one hand, the use of a considerable excess of previously formed reaction product, and therefore correspondingly larger dimensions of the mixing devices and, on the other hand, the use of much longer solidification periods.

The process which has been described above has the following advantages over known processes of this type;

The fact that it is carried out continuously permits a saving of labor and the use of apparatus of a size smaller than those used in the known processes.

The fact that the liquid material or the reaction components are applied onto a preheated solid end product, with substantially immediate solidification thereof, makes it possible to effect the solidification in the desired zone and operate with greatly shortened solidification periods. It also prevents undesirable baking on the walls of the apparatus. There is obtained a practically dust-free granular product which is easy to handle. Moreover, an end product is obtained which contains no hydroxyl groups, which fact is very important for the usage of the AlF$_3$ in the production of aluminum.

The resulting material can be reacted with sodium fluoride to form cryolite. The aluminum fluoride hydrate prepared according to this invention is practically free of alumina so as to furnish, by a subsequent calcination, a 95–97% aluminum fluoride.

The following examples of the process of this invention are to be considered illustrative only and not limiting.

Example I

In a mixing vessel of about 200 liters capacity are simultaneously and continuously introduced substantially dry and finely-divided hydrated aluminum oxide —[Al(OH)$_3$]— and aqueous hydrofluoric acid of 60% concentration, the molar ratio being 1:3, with the hydrofluoric acid being admitted in a 5% excess above this molar ratio. The two components are intimately mixed together by the use of a stirrer. After the reaction is completed, the resulting liquid phase is transferred by means of a double endless screw to a heated rotating drum. The liquid is caused to fall in the form of drops on previously solidified aluminum fluoride hydrate heated to about 120° C., which is present in the drum as a layer having a height of about 30 cm., and immediately hardens thereon. The material, upon solidifying, falls through an overflow connection at the end of the drum opposite the feed inlet and is transferred for calcination into a drying oven. The quantity of aluminum fluoride thus prepared amounts to about 700–800 kg. per hour. The aluminum fluoride yield, based upon the hydrofluoric acid feed, is about 99%, taking into consideration the recovery of hydrofluoric acid waste gases.

Example II

Into the front part of a heated rotating drum are separately introduced hydrofluoric acid of approximately 60% strength through an inlet pipe and substantially dry Al(OH)$_3$ containing only a low amount of water by the uptake of moisture from the air, with the aid of a conveyor screw, in a molar ratio of about 3:1, with the hydrofluoric acid admitted in an excess of 5–10% above this molar ratio. Previously solidified aluminum fluoride heated to 50–120° C. is already present in the drum as a layer having a height of 30–40 cm. The two starting materials react in the rotating drum on the aluminum fluoride present therein and form a granular aluminum fluoride hydrate which falls out of the drum through an overflow device, whereupon it is dehydrated in a calcining oven. The quantity produced and the yield correspond to those of Example I.

What is claimed is:

1. A process for the continuous preparation of aluminum fluoride from hydrated aluminum oxides and hydrofluoric acid which comprises mixing and reacting hydrated alumnum oxide and aqueous hydrofluoric acid in a concentration to maintain an HF concentration in the reaction mixture of at least 50 percent and solidifying the reaction product on a moving bed of solid granules of aluminum fluoride having a particle size of between about 10 and 30 mm. maintained at a temperature greater than about 50° C. said moving bed containing sufficient granules of aluminum fluoride to prevent incrustation on the walls of the reactor.

2. The process of claim 1 in which a viscous reaction product of the hydrated aluminum oxide and aqueous hydrofluoric acid is introduced to the moving granule bed.

3. The process of claim 1 in which the hydrated aluminum oxide and aqueous hydrofluoric acid are reacted in the presence of the said moving granule bed.

4. The process of claim 1 in which the moving bed is provided in the amount of at least about 50% by weight of the reaction mixture.

5. The process of claim 1 where the bed is held at a temperature of about 100–150° C.

6. The process of claim 1 wherein Al(OH)$_3$ is used as starting material.

References Cited

UNITED STATES PATENTS

| 1,851,475 | 3/1932 | Zimmermann | 23—88 |
| 2,454,921 | 11/1948 | Heinemann | 23—88 |
| 3,207,575 | 9/1965 | Garing et al. | 23—88 |

FOREIGN PATENTS

| 656,374 | 8/1951 | Great Britain. |
| 537,403 | 2/1957 | Canada. |

OSCAR R. VERTIZ, *Primary Examiner.*

EDWARD STERN, *Examiner.*